(12) United States Patent
Tryon

(10) Patent No.: US 8,409,041 B2
(45) Date of Patent: Apr. 2, 2013

(54) PUMP COVER INLET PORTING AND SEAL FOR HYBRID TRANSMISSION

(75) Inventor: Eric S. Tryon, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 1275 days.

(21) Appl. No.: 12/185,850

(22) Filed: Aug. 5, 2008

(65) Prior Publication Data

US 2009/0250886 A1 Oct. 8, 2009

Related U.S. Application Data

(60) Provisional application No. 61/042,004, filed on Apr. 3, 2008.

(51) Int. Cl.
*F16H 31/00* (2006.01)
(52) U.S. Cl. ......................................... 475/136; 475/137
(58) Field of Classification Search .................... 475/59, 475/136, 137, 159
See application file for complete search history.

(56) References Cited

U.S. PATENT DOCUMENTS 4,274,303 A * 6/1981 Shindo et al. ................. 475/136

* cited by examiner

*Primary Examiner* — David D Le
*Assistant Examiner* — Derek D Knight
(74) *Attorney, Agent, or Firm* — Quinn Law Group, PLLC

(57) ABSTRACT

A hybrid transmission is provided, including a transmission housing with an input cover attached to a main housing portion, and a hydraulic fluid reservoir in fluid communication with and attached to the transmission housing. The transmission also includes an input shaft in driving communication with an engine. A pump cover is attached to the input housing to define a pump pocket therebetween. A torque transmitting assembly is secured to the pump cover. The torque transmitting assembly includes a piston housing member that is coaxial with and longitudinally spaced from the pump cover to define an inlet passage therebetween. The inlet passage is configured to communicate the hydraulic fluid reservoir with the transmission housing, and is oriented at least partially radially adjacent to the pump pocket. A gasket member is disposed between the pump cover and piston housing member, and configured for fluidly sealing the same.

20 Claims, 2 Drawing Sheets

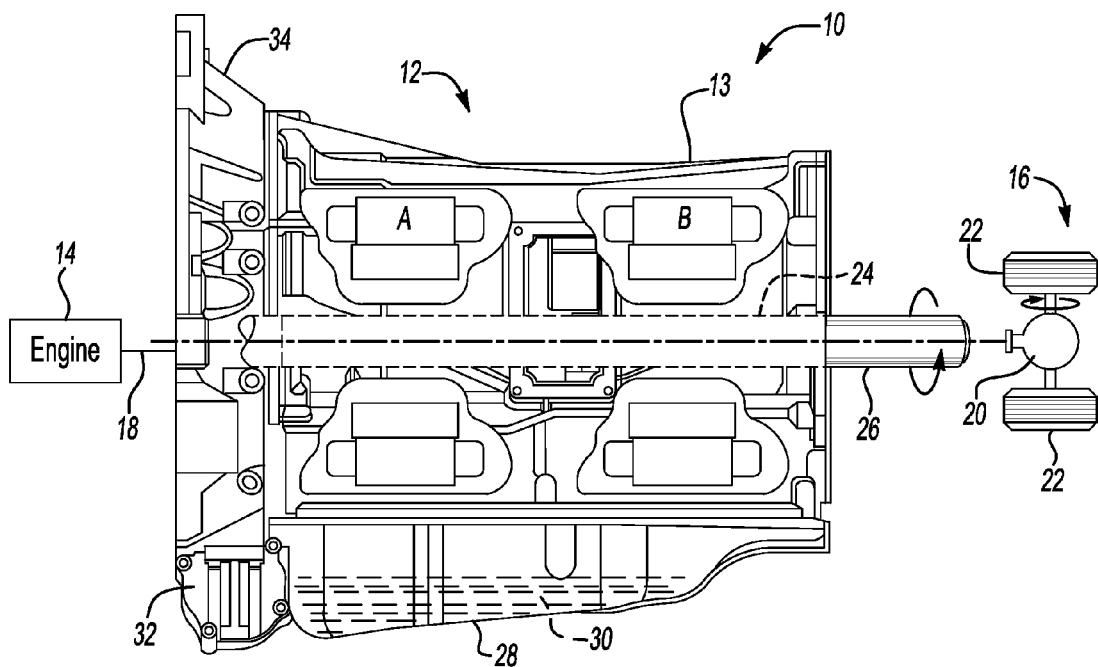
Fig-1
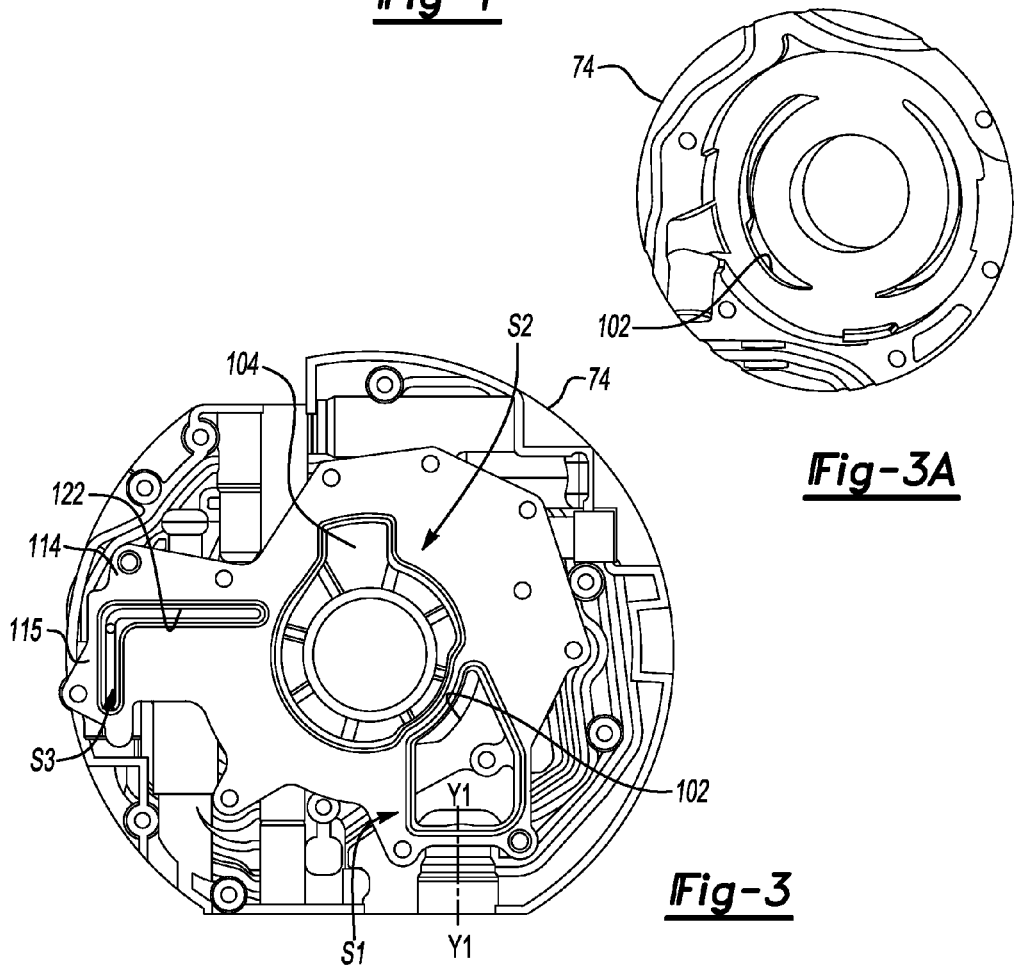
Fig-3A
Fig-3

PUMP COVER INLET PORTING AND SEAL FOR HYBRID TRANSMISSION

CLAIM OF PRIORITY AND CROSS-REFERENCE TO RELATED APPLICATION

This application claims the benefit of and priority to U.S. Provisional Patent Application No. 61/042,004, filed on Apr. 3, 2008, which is hereby incorporated by reference in its entirety.

TECHNICAL FIELD

The present invention relates generally to motorized vehicle powertrains, and more specifically to inlet porting and seal structures for engine-driven hydraulic pump assemblies in multi-mode, hybrid-type power transmissions.

BACKGROUND OF THE INVENTION

In general, motorized vehicles, such as the conventional automobile, include a powertrain that is comprised of an engine in power flow communication with a final drive system (e.g., rear differential and wheels) via a multi-speed power transmission. Hybrid-type powertrains generally employ an internal combustion engine (ICE) and one or more motor/generator units that operate either individually or in concert to propel the vehicle. That is, power output from the engine and motor/generators are transferred through planetary gearing in the multi-speed transmission for communication to the vehicle's final drive system. The primary function of the power transmission is to regulate speed and torque to meet operator demands for vehicle speed and acceleration.

One premise behind hybrid-type vehicles is that alternative power is available to propel the vehicle, minimizing reliance on the engine for power, thereby increasing fuel economy. Since hybrid-type vehicles can derive their power from sources other than the engine, engines in hybrid-type vehicles typically operate at lower speeds more often than their traditional counterparts, and can be turned off while the vehicle is propelled by the alternative power source(s). For example, electrically variable transmissions alternatively rely on electric motors housed in the transmission to power the vehicle's driveline.

To operate properly, the power transmission requires a supply of pressurized fluid, such as conventional transmission oil. The pressurized fluid may be used for such functions as cooling and lubrication. The lubricating and cooling capabilities of transmission oil systems greatly impact the reliability and durability of the transmission. Additionally, multi-speed power transmissions require pressurized fluid for controlled engagement and disengagement, on a desired schedule, of the various torque transmitting mechanisms that operate to establish the speed ratios within the internal gear arrangement.

Transmissions are traditionally supplied with hydraulic fluid by a wet sump (i.e., internal reservoir) oil system, which is separate from the engine's oil system. The fluid is typically stored in a main reservoir or main sump volume where it is introduced to a pickup or inlet tube for communication to one or more hydraulic pumps. In hybrid-type transmissions, it is conventional practice to have one hydraulic pump assembly that is driven by the engine (e.g., via the engine crankshaft) for supplying hydraulic pressure to the transmission control system. It is also conventional practice to have an additional pump which is driven from alternate power sources so that pressure is available when the engine is not running and the vehicle is in motion.

SUMMARY OF THE INVENTION

In accordance with one embodiment of the present invention, a hybrid transmission is provided. The transmission has a transmission housing generally consisting of an input housing portion operatively attached to a main housing portion. A hydraulic fluid reservoir is attached to the transmission housing, and configured to provide hydraulic fluid thereto. The transmission also includes at least one shaft that is in driving communication with an engine.

A pump housing (also referred to herein as "pump cover") is attached to the input housing portion to define a pump pocket therebetween. The input housing is preferably secured to the pump cover by a plurality of circumferentially spaced bolts. An annular plate member is longitudinally spaced from the pump housing to define an inlet passage therebetween.

The inlet passage is designed to fluidly communicate the hydraulic fluid reservoir with the pump pocket. The inlet passage is at least partially radially aligned with the pump pocket, preferably extending radially outward therefrom. Ideally, the inlet passage is located at least partially underneath the pump pocket when the transmission is mounted to a vehicle.

According to one aspect of this embodiment, the fluid inlet passage has a filter inlet portion that is adjacent to an outer peripheral edge of the pump housing, and a pump inlet portion that is adjacent to an inner peripheral edge of the pump housing (e.g., contiguous to the pump pocket intake porting). The filter inlet portion and pump inlet portion both have distinct longitudinal cross-sectional areas, where the pump inlet portion longitudinal cross-sectional area is less than the filter inlet portion longitudinal cross-sectional area. It is further desired that the pump inlet portion have a lateral cross-sectional area that is greater than its longitudinal cross-sectional area. Finally, the filter inlet portion preferably extends radially coplanar with the pump pocket, whereas the pump inlet portion is longitudinally axially offset from the pump pocket. A suction inlet configuration according to the present invention—i.e., with the inlet passage nested underneath the pump pocket and the relative dimensions of the pump inlet longitudinal and lateral cross-sectional areas, allows the main pump to be operatively packaged at the forward most portion within the main housing of the transmission, while minimizing the overall longitudinal length of the transmission.

In accordance with another aspect, the hybrid transmission also includes a gasket member that is positioned between the pump housing and the annular plate member (e.g., piston housing), and configured for fluidly sealing the same. That is, the gasket member preferably defines a plurality of individual and separate pressure seal sections for transferring hydraulic fluid through the pump housing. A first pressure seal section is configured for distributing fluid from the inlet passage, through the pump cover, to the pump pocket. A second pressure seal section is configured for distributing fluid from the cooler return fluid passage adjacent to the pump pocket to a first portion of the transmission—e.g., fluid from cooler return circuit through the engine-driven shaft and throughout the transmission cross section. Finally, a third pressure seal section is configured for distributing fluid from the aux pump fluid passage to a second portion of the transmission—e.g., for clutch piston feed oil. The first, second, and third pressure seal sections essentially provide individual fluidly-sealed cavities for transferring hydraulic fluid through the pump housing. The gasket member preferably includes a carrier member with a molded rubber strip attached thereto. Ideally, the carrier member is made from aluminum.

According to yet another aspect of this embodiment, a pump assembly is operatively housed within the pump pocket, and drivingly connected to the engine-driven shaft for common rotation therewith. The pump assembly preferably includes a pump rotor driving engaged with the engine-driven shaft such that rotation of the shaft turns the pump rotor, creating a pressure gradient inside of the pump pocket, thereby drawing fluid from the hydraulic fluid reservoir into the pump pocket via the inlet passage. Specifically, the engine-driven shaft includes a plurality of flats circumferentially spaced along and protruding outward from an outer peripheral surface thereof. The pump rotor includes a plurality of flats that are circumferentially spaced along and protruding inward from an inner peripheral surface thereof. The first and second pluralities of flats are configured to mate with each other, and thereby drivingly connect the pump rotor to engine-driven shaft. Ideally, the pump assembly is a vane-type pump.

In accordance with another preferred embodiment of the present invention, a multi-mode, hybrid-type power transmission is provided. The transmission includes a transmission housing that generally consists of an input housing that is positively attached (e.g., bolted) to a main housing portion. An oil pan for stowing hydraulic fluid is in fluid communication with, and attached to the main housing portion. A transmission input shaft is in driving communication with an engine crankshaft.

The hybrid transmission also includes a pump housing that is positively attached to the input housing to define a substantially cylindrical pump pocket therebetween. The pump pocket circumscribes, and is coaxially aligned with the transmission input shaft. A hydraulic pump assembly is housed at least partially inside the pump pocket, and drivingly connected to the transmission input shaft. A torque transmitting assembly, such as a hydraulic brake device, is positively attached to the pump housing. The torque transmitting assembly includes a piston housing member that is coaxial with, and longitudinally spaced from the pump housing to define a fluid inlet passage therebetween. The fluid inlet passage is configured to fluidly communicate the oil pan with the pump pocket and, thus, the hydraulic pump assembly.

The inlet passage is at least partially radially aligned with and oriented radially adjacent to the pump pocket. Ideally, the inlet passage is nested at least partially underneath the pump pocket when the transmission is mounted to a vehicle. The inlet passage preferably includes a filter inlet portion that is positioned immediately adjacent to an outer peripheral edge of the pump housing, proximate to the oil pan. In this regard, the fluid inlet passage also includes a pump inlet portion that is positioned immediately adjacent to an inner peripheral edge of the pump housing, proximate to the pump pocket. The filter inlet portion has a first longitudinal cross-sectional area, whereas the pump inlet portion has a second longitudinal cross-sectional area that is less than the first longitudinal cross-sectional area. Moreover, the pump inlet portion has a lateral cross-sectional area that is greater than the second longitudinal cross-sectional area.

According to another aspect of this embodiment, a gasket member is positioned between the pump housing and piston housing member, and configured for fluidly sealing the same. The gasket member defines first, second and third separate pressure seal sections for transferring hydraulic fluid through the pump housing. The first pressure seal section distributes fluid from the inlet passage to the pump pocket, the second pressure seal section distributes fluid from the cooler return fluid passage adjacent to the pump pocket to an interior cavity of the transmission input shaft, and the third pressure seal section distributes fluid from the aux pump fluid passage to the torque transmitting assembly.

The above features and advantages, and other features and advantages of the present invention, will be readily apparent from the following detailed description of the preferred embodiments and best modes for carrying out the invention when taken in connection with the accompanying drawings and appended claims.

BRIEF DESCRIPTION OF THE DRAWINGS

FIG. 1 is a schematic representation of an exemplary vehicle powertrain arrangement with a multi-mode, hybrid-type power transmission for integration and use of the present invention;

FIG. 3 is a rear plan-view illustration of the pump housing and gasket member of FIG. 2; and FIG. 3A is an elevated frontal perspective view illustration of a portion of the pump housing of FIG. 2.

DESCRIPTION OF THE PREFERRED EMBODIMENT

Figure 2:
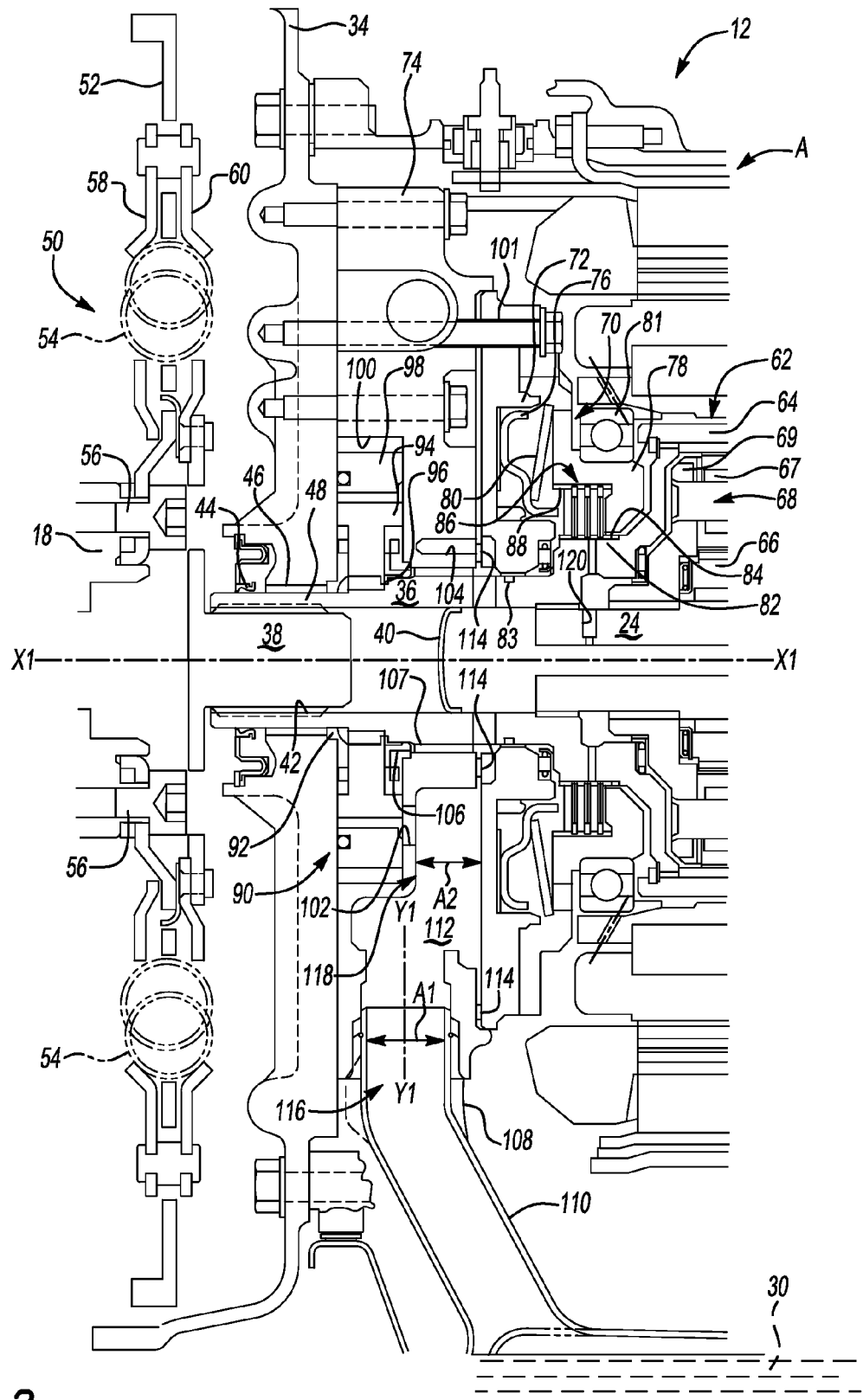
FIG. 2 is a longitudinal cross-sectional illustration of a forward portion of the hybrid transmission of FIG. 1.

The present invention is described herein in the context of a vehicle powertrain having a multi-mode, multi-speed, hybrid-type power transmission. The hybrid powertrain illustrated in FIG. 1 has been greatly simplified, it being understood that further information regarding the standard operation of a hybrid power transmission (or a hybrid-type vehicle for that matter) may be found in the prior art. Furthermore, it should be readily understood that FIG. 1 merely offers a representative application by which the present invention may be incorporated and practiced. As such, the present invention is by no means limited to the particular arrangement illustrated in FIG. 1.

Referring to the drawings, wherein like reference numbers refer to like components throughout the several views, there is shown in FIG. 1 a schematic depiction of an exemplary vehicle powertrain system, identified generally as 10, having a restartable engine 14 drivingly connected to, or in power flow communication with, a final drive system 16 via a hybrid-type power transmission 12. The engine 14 transfers power, preferably by way of torque, to the transmission 12 by an engine output shaft 18 (commonly referred to as "crankshaft"). The transmission 12, in turn, distributes torque from a transmission output shaft 26 to drive the final drive system 16, represented herein by a differential 20 and wheels 22, and thereby propel the hybrid vehicle (not specifically identified herein). In the embodiment depicted in FIG. 1, the engine 14 may be any engine, such as, but not limited to, a 2-stroke diesel engine or a 4-stroke gasoline engine, which is readily adapted to provide its available power output typically at a number of revolutions per minute (RPM). Although not explicitly illustrated in FIG. 1, it should be appreciated that the final drive system 16 may comprise any known configuration, such as front wheel drive (FWD), rear wheel drive (RWD), four-wheel drive (4WD), or all-wheel drive (AWD).

The transmission 12 is adapted to manipulate and distribute power from the engine 14 to the final drive system 16. Specifically, engagement of one or more torque transmitting devices housed within the transmission 12 (e.g., clutch 70 of FIG. 2) interconnects one or more epicyclic gear arrangements, preferably in the nature of interconnected planetary gear sets (one of which is shown in FIG. 2 and designated generally as 62) to transfer power from the engine 14 at varying ratios to the transmission output shaft 26. The transmission 12 may utilize one or more planetary gear sets in collaboration with, or independent of, one or more clutches and brakes to provide input split, compound split, and fixed ratio modes of operation.

FIG. 1 displays certain selected components of the transmission 12, including a main housing 13 configured to encase and protect first and second electric motor/generator assemblies A and B, respectively. The first and second motor/generators A, B are concentric with and connectable to a main shaft of the transmission 12, shown hidden at 24, preferably through the above noted series of planetary gear sets. The motor/generators A, B operate, in conjunction with the planetary gear sets and selectively engageable torque transmitting mechanisms, to rotate the transmission output shaft 26. The main housing 13 covers the inner most components of the transmission 12, such as the motor/generators A, B, planetary gear arrangements, main shaft 24, and torque transmitting devices. The motor/generator assemblies A, B are preferably configured to selectively operate as a motor and a generator. That is, the motor/generator assemblies A, B are capable of converting electrical energy to mechanical energy (e.g., during vehicle propulsion), and converting mechanical energy to electrical energy (e.g., during regenerative braking).

An oil pan or sump volume 28 (also referred to herein as "hydraulic fluid reservoir") is located on the base of the main housing 13, and is configured to stow or store hydraulic fluid, such as transmission oil (shown hidden in FIG. 1 at 30) for the transmission 12 and its various components. Additionally, an auxiliary (or secondary) transmission pump 32 is mounted to the main transmission housing 13. The auxiliary oil pump 32 is in fluid communication (e.g., via hydraulic circuitry) with the transmission 12 to provide pressurized fluid to the transmission 12 during specific operating conditions, such as engine-off mode and transitionary phases thereto and therefrom.

FIG. 2 of the drawings is a longitudinal cross-sectional illustration of the forward most portion of the hybrid transmission 12 from FIG. 1. Power is transferred from the engine 14 to the transmission 12 by a hollow, internally-splined input shaft 36, which is disposed forward of the main shaft 24 (relative to the powertrain 10). The input shaft 36 is concentric with main shaft 24—i.e., both shafts 24, 36 are longitudinally disposed inside the transmission main housing 13, and rotatable about center axis X1. The main shaft 24 and the input shaft 36 are preferably hollow to facilitate the cooling and lubrication of the transmission 12, as will be described in detail hereinbelow.

The input shaft 36 is mated to an externally splined damper hub 38. The splined engagement between the input shaft 36 and damper hub 38 is maintained in a dry state by sealing them against pressurized transmission fluid (e.g., transmission oil 30 of FIG. 1). In the embodiment shown, sealing is accomplished with a freeze plug 40, which is an expandable plug that is press-fit into an internal cavity 42 of the input shaft 36. However, it should be recognized that fluidly sealing the splined engagement between the input shaft 36 and damper hub 38 could also be accomplished by alternate means, such as a solid input shaft (e.g., no internal cavity 42). In a similar respect, an input seal 44 and bushing 46 ride along an outer surface of the input shaft journal portion 48, intermediate the transmission input cover 34 (also referred to herein as "input housing") and the input shaft 36, to seal the input shaft journal portion 48 against pressurized transmission fluid.

To isolate and counteract unwanted torsionals and compression pulses generated by operation of the engine 14, the transmission 12 is equipped with a dry-type torsional damper assembly, identified generally as 50, interposed between the engine crankshaft 18 and the transmission input shaft 36. In other words, the torsional damper assembly 50 generally functions to isolate the transmission 12 from unwanted torsionals generated by the engine 14 during operation, and also to aid the first and second motor/generator assemblies A, B in canceling engine compression pulses during startup and shutdown operations.

According to the embodiment of FIG. 2, the torsional damper assembly 50 includes an annular damper flange 52 having a series of spring-mass damper systems (two of which are shown in phantom in FIG. 2 and labeled as 54) elongated annularly or circumferentially along and proximate to its outer periphery. The damper flange 52 is attached and secured to the engine crankshaft 18, for example, by one or more circumferentially spaced crank bolts 56. An engine-side cover (or front hub plate) 58 and a transmission-side cover (or rear hub plate) 60 house the damper flange 52 and spring-mass damper systems 54 therebetween, and attach the torsional damper assembly 50 to the externally splined damper hub 38. As noted above, power is transferred from the damper hub 38 to the transmission 12 via the splined connection with input shaft 36. The spring-mass dampers 54 absorb and dampen the unwanted torsionals produced by the engine 12 during drive mode operation, as well as transitions to and from engine-off mode. The torsional damper assembly 50 has a torque capacity equal to the maximum torque capacity of the engine plus some margin.

The hybrid-type power transmission 12 preferably includes three planetary gear sets; however, only one of which is visible in the drawings and indicated generally at 62 in FIG. 2. The planetary gear set 62 includes an outer gear member 64, typically designated as a ring gear, concentrically aligned with and circumscribing an inner gear member 66, typically designated as a sun gear. A planet carrier assembly member 68, which is concentrically aligned with and splined to main shaft 24, includes a plurality of pinion gears 67 that are rotatably mounted on a carrier member 69 and disposed in meshing relationship with both the ring gear member 64 and the sun gear member 66. Recognizably, the carrier can be either a single-pinion carrier (simple) or a double-pinion carrier (compound) without departing from the intended scope of the present invention.

As seen in FIG. 2, the ring gear member 64 of planetary gear set 62 is selectively connectable to the transmission main housing 13 (by way of bolted interconnections to pump housing 74 and input housing 34) through selective actuation of a stationary type torque-transmitting mechanism 70 (also referred to hereinafter as "brake assembly" or "reaction clutch"). The brake assembly 70 includes an annular piston housing member 72 which is supported on the pump housing 74. A piston member 76 is axially movable or slidable within an apply chamber, which is partially defined by piston housing member 72 and backing plate member 78, and filled with hydraulic fluid. A biasing member, such as Bellville return spring 80, biases the piston 76 into a non-applied or inactive position. The backing plate member 78 also acts as a bearing support for the first motor/generator assembly A—i.e., motor bearing 81 is press-fit and supported on an outer surface of the backing plate member 78. Moreover, the piston housing member 72 serves as the outer-diameter (OD) bore for an input shaft rotating seal ring 83.

A plurality of friction plates, identified collectively by reference numeral 82, are mounted, fixed, or attached to the ring gear member 64 by a splined outer surface 84. Each of the friction plates 82 has a coating or layer of friction material on opposing sides thereof. A plurality of reaction plates, identified collectively in FIG. 2 at 86, are interleafed (i.e., alternately spaced) with the friction plates 82. Each reaction plate 86 has an outer periphery defining an exterior splined area that is disposed in meshing relationship with a splined surface 88 formed along an inner periphery the annular backing plate member 78. The friction plates 82 and reaction plates 86 cooperate to form a conventional clutch pack.

During operation of the reaction clutch assembly 70, the apply chamber (i.e., the hydraulic vessel formed between the housing member 72 and backing plate member 78) is pressurized with hydraulic fluid, thereby urging the piston 76 rightward into the clutch pack. In so doing, the reaction plates 86 translate axially to frictionally engage the adjacent faces of the friction plates 82. When sufficient force is applied via the piston 76, the transmission input shaft 36 and, thus, the ring gear member 64 (which is formed thereto) and the engine crankshaft 18 and torsional damper assembly 50 (which are attached thereto) are frictionally locked and grounded to the transmission main housing 13. When the pressure in the apply chamber is exhausted, the piston 76 will be urged leftward to a disengaged position by the force of the return spring 80.

With continuing reference to FIG. 2, transmission oil 30 is transferred from oil pan 28 by a main pump 90 (also referred to herein as "engine pump" or "engine-driven pump"), into the hollow centers of the input shaft 36 and main shaft 24 via passage 104, which ideally cooperate to run the entire length of the transmission 12, for subsequent communication to the various components therein. The main pump 90 is preferably of the vane type comprising a pump rotor 94, wherein a plurality of vanes (not shown) are slidably disposed, and a slide member 98 to vary the volume of fluid delivered from the main pump 90. The main pump 90 is located in the forward portion of the transmission housing 13, encased between the input housing 34 and pump housing 74 (also referred to herein as "pump cover"). The main pump 90 is axially aligned with and driven by the input shaft 36, through a driving engagement with journal portion 48. Specifically, the input shaft journal 48 is designed with a first plurality of flats 92 (preferably two) circumferentially spaced along, and protruding outward from an outer peripheral surface thereof. The flats 92 pilot and drive a pump rotor 94, which has a second plurality of complimentary flats 96 (also preferably two) spaced circumferentially about, and protruding inward from an inner peripheral surface thereof which mate with the first plurality of flats 92.

The collaborative connection between the flats 92, 96 is capable of transferring power from the input shaft 36 to the pump rotor 94 such that the main pump 90 provides the hydraulic pressure necessary for operating the transmission 12. When the pump rotor 94 rotates, it creates a pressure gradient inside of a cylindrical pump pocket 100 formed at least partially by the transmission input housing 34 and the pump housing 74. For example, the main pump 90 has intake porting 102, which passes through the pump housing 74 (as best seen in FIG. 2), for receiving hydraulic fluid from the transmission's sump 28 on its intake side. With the pump rotor 94 supplied with torque, it turns to drive the vanes (not shown) to provide pumping action to deliver hydraulic fluid at pressure to operate the transmission 12 and, potentially, other hydraulically operated vehicular equipment. The first and second plurality of flats 92, 96, along with a pump guide 106, center and guide the pump rotor 94 during operation of the main pump 90. A pump cover bushing 107 and the input bushing 46 handle loads created by the main pump 90. Placing the engine-driven main pump 90 and pump pocket 100 inside of the pump cover 74 will help decrease the overall axial length of the transmission 12.

The pressure gradient created by main pump 90 draws fluid 30 from the oil pan 28 through an oil filter 108, located at a distal end of a sump connection arm 110 which fluidly communicates the oil pan 28 with the pump cover 74. Fluid 30 is drawn from the sump connection arm 110 into inlet passage 112, along path Y1, which is nestably oriented vertically adjacent the main pump 90. More specifically, the inlet passage 112 and filter 108 (including filter inlet portion 116) are moved forward within the transmission 12, positioned underneath the main pump 90 at least partially radially coplanar with the pump pocket 100, such orientation best seen in FIG. 2. Put another way, the inlet passage 112 is oriented at least partially radially adjacent to and aligned with (i.e., along the same radial plane as) the pump pocket 100.

According to the embodiment of FIG. 2, the inlet passage 112 is defined by the area between the pump housing 74 and reaction clutch assembly 70 (i.e., piston housing member 72). The inlet passage 112 is fluidly sealed by a gasket member 114, which is preferably made of an aluminum carrier with a molded rubber strip attached thereto. The reaction clutch assembly 70 is bolted to the rearward face of the pump housing 74 (e.g., via bolt 101), with the piston housing member 72 clamping through the gasket member 114, and compressing the rubber ring 115 (shown in FIG. 3) to suction-seal the oil.

The inlet passage 112 may be divided into two primary portions: the filter inlet portion, indicated generally in FIG. 2 at 116, and the pump inlet portion, indicated generally at 118. The longitudinal cross-sectional area of the filter inlet portion 116 (i.e., relative to the transmission 12), which is indicated for explanatory purposes by A1 in FIG. 2, is greater than the longitudinal cross-sectional area of the pump inlet portion 118, which is indicated for explanatory purposes in FIG. 2 at A2. However, in order to maintain cross-sectional flow area and, thus, volumetric flow of the fluid 30 to the main pump 90 and pump pocket 100 without impacting the overall length of the transmission 12, the back side of the pump housing 74 is cast open at the pump inlet 102, adding additional lateral cross-sectional area (relative to the transmission 12) to offset the difference between the cross-section areas A1, A2 in the longitudinal direction. Ideally, the lateral cross-sectional area of the pump inlet portion 118 is greater than the longitudinal cross-sectional area A2. The suction inlet configuration according to the present invention—i.e., the filter 108 and inlet passage 112 nested underneath the pump pocket 100 and the cored open rear face of the pump housing 74, allows the main pump 90 to be operatively packaged within main housing 13 while minimizing the overall longitudinal length of the transmission 12.

Referring now to FIG. 3, the gasket member 114 of the present invention defines a plurality of individual and separate pressure seal sections for transferring hydraulic fluid through the pump cover 74, defined herein by first, second and third pressure seal sections S1, S2 and S3, respectively. That is, the gasket 114 is designed and oriented, as seen in FIG. 3, to provide a first pressure seal section, generally indicated at S1 in FIG. 3, for the transmission of oil 30 from the inlet passage 112 to the main pump 90 (e.g., through intake porting 102). The gasket 114 also provides a second pressure seal section, generally indicated at S2 in FIG. 3, for the transmission of oil 30 from the cooler return fluid passage adjacent to the pump pocket 100 to an interior cavity of the main shaft 24 and transmission input shaft 36, for subsequent distribution throughout the transmission cross section (e.g., through transmission cross-section porting 120). Finally, the third pressure seal section, generally indicated at S3 in FIG. 3, is designed to distribute fluid from the aux pump fluid passage in the pump cover 74 to the clutch piston feed oil (e.g., through clutch feed porting 122). The first, second, and third pressure seal sections S1-S3 essentially provide individual fluidly-sealed cavities for transferring hydraulic fluid through the pump housing 74.

While the best modes for carrying out the present invention have been described in detail hereinabove, those familiar with the art to which this invention relates will recognize various alternative designs and embodiments for practicing the invention within the scope of the appended claims.

The invention claimed is:

1. A multi-mode hybrid-type power transmission having a transmission housing including an input cover positively attached to a main housing portion, an oil pan for stowing hydraulic fluid in fluid communication with and attached to the main housing portion, and a transmission input shaft in driving communication with an engine crankshaft, the hybrid transmission comprising:
a pump housing positively attached to the input cover to define a substantially cylindrical pump pocket therebetween, wherein said pump pocket circumscribes and is coaxially aligned with the transmission input shaft;
a hydraulic pump assembly operatively housed at least partially inside said pump pocket; and
a torque transmitting assembly positively attached to said pump housing, said torque transmitting assembly having a piston housing member coaxial with and longitudinally spaced from said pump housing to define a fluid inlet passage therebetween that is configured to fluidly communicate the oil pan with said pump pocket;
wherein said inlet passage is at least partially radially aligned with and oriented radially adjacent to said pump pocket; and
wherein said inlet passage includes a filter inlet portion positioned immediately adjacent to an outer peripheral edge of said pump housing, and a pump inlet portion positioned immediately adjacent to an inner peripheral edge of said pump housing, and wherein said filter inlet portion has a first longitudinal cross-sectional area and said pump inlet portion has a second longitudinal cross-sectional area that is less than said first longitudinal cross-sectional area.

2. The hybrid transmission of claim 1, wherein said inlet passage is located at least partially underneath said pump pocket when the transmission is mounted to a vehicle.

3. The hybrid transmission of claim 1, wherein said pump inlet portion has a lateral cross-sectional area that is greater than said second longitudinal cross-sectional area.

4. The transmission of claim 1, further comprising:
a gasket member disposed between said pump housing and said piston housing member, wherein said gasket member defines a plurality of separate pressure seal sections for transferring hydraulic fluid through said pump housing.

5. The transmission of claim 4, wherein said plurality of pressure seal sections includes a first pressure seal section for distributing fluid from said inlet passage to said pump pocket, a second pressure seal section for distributing fluid from said pump pocket to an interior cavity of the transmission input shaft, and a third pressure seal section for distributing fluid from said pump pocket to said torque transmitting assembly.

6. The transmission of claim 1, wherein said pump assembly includes a pump rotor drivingly engaged to the transmission input shaft such that rotation of the transmission input shaft turns said pump rotor creating a pressure gradient inside of said pump pocket thereby drawing fluid from the oil pan to said inlet passage.

7. The transmission of claim 6, wherein the transmission input shaft includes a first plurality of flats circumferentially spaced along an outer peripheral surface thereof, and said pump rotor includes a second plurality of flats circumferentially spaced along an inner peripheral surface thereof, wherein said first and second pluralities of flats are configured to mate with each other and thereby drivingly connect said pump rotor to the input shaft.

8. A multi-mode hybrid-type power transmission having a transmission housing including an input cover positively attached to a main housing portion, an oil pan for stowing hydraulic fluid in fluid communication with and attached to the main housing portion, and a transmission input shaft in driving communication with an engine crankshaft, the hybrid transmission comprising:
a pump housing attached to the input cover to define a substantially cylindrical pump pocket therebetween, wherein said pump pocket circumscribes and is coaxially aligned with the transmission input shaft;
a hydraulic pump assembly operatively housed at least partially inside said pump pocket; and
a torque transmitting assembly attached to said pump housing, said torque transmitting assembly having a piston housing member coaxial with and longitudinally spaced from said pump housing to define a fluid inlet passage therebetween that is configured to fluidly communicate the oil pan with said pump pocket;
a gasket member disposed between said pump housing and said piston housing member, wherein said gasket member defines a plurality of separate pressure seal sections for transferring hydraulic fluid through said pump housing; and
wherein said inlet passage is at least partially radially aligned with and oriented radially adjacent to said pump pocket.

9. The hybrid transmission of claim 8, wherein said inlet passage is located at least partially underneath said pump pocket when the transmission is mounted to a vehicle.

10. The hybrid transmission of claim 8, wherein said inlet passage includes a filter inlet portion positioned immediately adjacent to an outer peripheral edge of said pump housing, and a pump inlet portion positioned immediately adjacent to an inner peripheral edge of said pump housing, and wherein said filter inlet portion has a first longitudinal cross-sectional area and said pump inlet portion has a second longitudinal cross-sectional area that is less than said first longitudinal cross-sectional area.

11. The hybrid transmission of claim 10, wherein said pump inlet portion has a lateral cross-sectional area that is greater than said second longitudinal cross-sectional area.

12. The transmission of claim 8, wherein said plurality of pressure seal sections includes a first pressure seal section for distributing fluid from said inlet passage to said pump pocket, a second pressure seal section for distributing fluid from said pump pocket to an interior cavity of the transmission input shaft, and a third pressure seal section for distributing fluid from said pump pocket to said torque transmitting assembly.

13. The transmission of claim 8, wherein said pump assembly includes a pump rotor drivingly engaged to the transmission input shaft such that rotation of the transmission input shaft turns said pump rotor creating a pressure gradient inside of said pump pocket thereby drawing fluid from the oil pan to said inlet passage.

14. The transmission of claim 13, wherein the transmission input shaft includes a first plurality of flats circumferentially spaced along an outer peripheral surface thereof, and said pump rotor includes a second plurality of flats circumferentially spaced along an inner peripheral surface thereof, wherein said first and second pluralities of flats are configured to mate with each other and thereby drivingly connect said pump rotor to the input shaft.

15. A multi-mode hybrid-type power transmission having a transmission housing including an input cover positively attached to a main housing portion, an oil pan for stowing hydraulic fluid in fluid communication with and attached to the main housing portion, and a transmission input shaft in driving communication with an engine crankshaft, the hybrid transmission comprising:
- a pump housing attached to the input cover to define a substantially cylindrical pump pocket therebetween, wherein said pump pocket circumscribes and is coaxially aligned with the transmission input shaft;
- a hydraulic pump assembly operatively housed at least partially inside said pump pocket; and
- a torque transmitting assembly attached to said pump housing, said torque transmitting assembly having a piston housing member coaxial with and longitudinally spaced from said pump housing to define a fluid inlet passage therebetween that is configured to fluidly communicate the oil pan with said pump pocket;
- wherein said inlet passage is at least partially radially aligned with and oriented radially adjacent to said pump pocket;
- wherein said pump assembly includes a pump rotor drivingly engaged to the transmission input shaft such that rotation of the transmission input shaft turns said pump rotor creating a pressure gradient inside of said pump pocket thereby drawing fluid from the oil pan to said inlet passage; and
- wherein the transmission input shaft includes a first plurality of flats circumferentially spaced along an outer peripheral surface thereof, and said pump rotor includes a second plurality of flats circumferentially spaced along an inner peripheral surface thereof, wherein said first and second pluralities of flats are configured to mate with each other and thereby drivingly connect said pump rotor to the input shaft.

16. The hybrid transmission of claim 15, wherein said inlet passage is located at least partially underneath said pump pocket when the transmission is mounted to a vehicle.

17. The hybrid transmission of claim 15, wherein said inlet passage includes a filter inlet portion positioned immediately adjacent to an outer peripheral edge of said pump housing, and a pump inlet portion positioned immediately adjacent to an inner peripheral edge of said pump housing, and wherein said filter inlet portion has a first longitudinal cross-sectional area and said pump inlet portion has a second longitudinal cross-sectional area that is less than said first longitudinal cross-sectional area.

18. The hybrid transmission of claim 17, wherein said pump inlet portion has a lateral cross-sectional area that is greater than said second longitudinal cross-sectional area.

19. The transmission of claim 15, further comprising:
- a gasket member disposed between said pump housing and said piston housing member, wherein said gasket member defines a plurality of separate pressure seal sections for transferring hydraulic fluid through said pump housing.

20. The transmission of claim 19, wherein said plurality of pressure seal sections includes a first pressure seal section for distributing fluid from said inlet passage to said pump pocket, a second pressure seal section for distributing fluid from said pump pocket to an interior cavity of the transmission input shaft, and a third pressure seal section for distributing fluid from said pump pocket to said torque transmitting assembly.

* * * * *